United States Patent [19]

Honjo et al.

[11] 4,218,362

[45] Aug. 19, 1980

[54] POWDER MARKING AGENT AND MARKING METHOD

[75] Inventors: Satoru Honjo; Kenichi Sawada, both of Asaka; Masaki Fukagawa, Saga, all of Japan

[73] Assignees: Fuji Photo Film Co., Ltd., Ashigara; Chugoku Marine Paints, Ltd., Hiroshima, both of Japan

[21] Appl. No.: 852,263

[22] Filed: Nov. 17, 1977

[30] Foreign Application Priority Data

Nov. 19, 1976 [JP] Japan .............................. 51/139177

[51] Int. Cl.$^2$ ...................... C08L 27/18; C08L 67/02
[52] U.S. Cl. ................................ 260/40 R; 260/42.27; 427/195; 427/318; 427/327; 525/165
[58] Field of Search .................. 260/873, 40 R, 42.27; 427/195, 201, 318, 327; 525/165

[56] References Cited

U.S. PATENT DOCUMENTS

| | | | |
|---|---|---|---|
| 2,691,814 | 10/1954 | Tait | 427/195 X |
| 2,777,783 | 1/1957 | Welch | 525/165 X |
| 2,789,926 | 4/1957 | Finholt et al. | 427/195 X |
| 2,844,489 | 7/1958 | Gemmer | 427/201 X |
| 2,976,257 | 3/1961 | Dawe et al. | 525/165 X |
| 3,644,593 | 2/1972 | Nowak et al. | 260/873 X |
| 3,821,326 | 6/1974 | Lauchlon et al. | 260/873 |
| 3,824,115 | 7/1974 | Segawa et al. | 427/201 X |
| 3,832,314 | 8/1974 | Hoh et al. | 525/165 X |
| 3,936,569 | 2/1976 | Miller et al. | 427/318 X |

OTHER PUBLICATIONS

I. Goodman & J. Rhys, *Polyesters: vol. I. Saturated Polymers,* (1965), pp. 1–5.

*Primary Examiner*—Sandra M. Person
*Attorney, Agent, or Firm*—Sughrue, Rothwell, Mion, Zinn and Macpeak

[57] ABSTRACT

A powder marking agent comprising a fine powder which comprises, on a total volume basis,
  (a) about 48% to about 92% of a thermoplastic linear polyester,
  (b) about 5 to about 30% of a heat-resistant pigment, and
  (c) about 2 to about 40% of a fluorine-containing polymer,
with the total by volume percent of the heat-resistant pigment (b) and the fluorine-containing polymer (c) being about 45% or less and a marking method which comprises applying the powder marking agent described above onto a metal member in a marking pattern.

33 Claims, No Drawings

POWDER MARKING AGENT AND MARKING METHOD

BACKGROUND OF THE INVENTION

1. Field of the Invention

This invention relates to a fine powder of a marking agent and to a marking method using the marking agent and, more particularly, to an improved marking agent and method wherein clear durable marking patterns can be formed even on slightly heated or highly heated members as well as on unheated members.

2. Description of the Prior Art

As is well known in the art, steel members which are continuously produced in steel-making plants must be marked with necessary information to control the production process, to prevent different steel members from being mixed together during transportation, and to indicate the destinations of the steel members. Since steel members, particularly in continuous hot rolling mills are fed from the furnace while red hot or at a similar high temperature, adhesion of labels or the like to such members is almost impossible and thus a marking method using heat-resistant marking agents is required.

One of the most widely accepted marking methods is that which comprises holding a tin stencil, which has been previously made, on a steel member to be marked and spraying a heat-resistant paint through the stencil thereby marking the desired information on the steel member. However, this method must be done by hand work and it is thus undesirable from a standpoint of efficiency. In addition, a large number of stencils, which require a lot of time to make, must be available and the stencils have a relatively poor durability. As a result, great difficulty is encountered in having the required number of stencils available at all times.

Recently, in order to prevent working difficulties and facilitate a saving of labor, a number of marking methods have been proposed which comprise making a single-use stencil from paper using instructions from a computer, and controlling an automatic powder coating operation through the stencil and opening or closing a number of nozzles by means of the computer, thereby spraying the powder coating onto a member from a spray nozzle. Some of these marking methods are now employed into practice.

Marking methods based on electrostatic recording techniques using powdery marking agents are disclosed in our Japanese Patent Application Nos. 149244/1975 and 42090/1976.

In general, a hot rolled member to be marked is fed to the marking station at temperatures of from room temperature (about 10° C. to 20° C.) to about 400° C. Conventionally employed marking agents as described in *Keisoku Gijutsu (metering Techniques)* August pp 62–70 (1974), Japanese Patent Publication No. 17877/1972, etc. are those which are commercially available, or are similar in composition to commercially available powder coatings, and have the following drawbacks in common.

The marking agents are thermally decomposed to some degree before a hot member at above about 350° C., especially a thick member, cools to normal temperature. As a consequence, the final marking pattern has a low optical contrast and is so mechanically fragile that the pattern tends to be broken down by forces received during working operations such as transfer.

On the other hand, marking agents with very high heat-resistance as described in Japanese Patent Application (OPI) Nos. 104046/1975 and 105724/1975, Japanese Patent Publication Nos. 24406/1972 and 17496/1974 (etc. have excessively high melting points, so that it is very difficult to adhere the agents on a member even though heated, which is at a temperature below the melting points thereof.

SUMMARY OF THE INVENTION

Therefore, an object of the present invention to provide a powder marking agent which has excellent toner characteristics, particularly for electrostatic recording, and which is improved and overcomes the drawbacks of the above-described marking agents.

The objects of this invention can be achieved in a marking method using a marking agent of a fine powder which comprises as essential components (a) about 48 to about 92% by volume of a thermoplastic linear polyester, (b) about 5 to about 30% by volume of a heat-resistant pigment, and (c) about 2 to about 40% by volume of a fluorine-containing polymer, with the total of the heat-resistant pigment (b) and the fluorine-containing polymer (c) comprising about 45% by volume or less of the marking agent.

DETAILED DESCRIPTION OF THE INVENTION

The respective components of the fine powder marking agent used in this invention are described in detail below.

The heat-resistant pigments selected should be resistant against the high temperatures of the steel members to be marked. In the practice of the invention, the upper limit of the steel member temperature is about 400° C. As a result, the heat-resistant pigments of this invention should not be decomposed or denatured at a temperature of at least up to about 400° C. Accordingly, preferred pigments are preferably inorganic pigments, e.g., white or light-colored heat-resistant pigments having a high refractive index such as titanium dioxide, zinc oxide, zinc sulfide, antimony oxide, zirconium oxide, etc. In addition, extender pigments such as barium sulfate, aluminum oxide, silicon oxide, calcium silicate, etc., may be used in admixture with the above-described heat-resistant pigments, e.g., in amounts up to about 40% by volume based on the total amount of pigment, for economy and to adjust the physical characteristics of the fine powder.

The steel plate or member generally has a dark-colored appearance. The marking agent preferably forms a light-colored pattern on the dark member. However, it is possible to first form a light-colored heat-resistant film on the member and then produce a dark-colored marking pattern on the film as disclosed in our Japanese Patent Application No. 44833/1976. In this case, colored pigments having good heat resistance such as carbon black, graphite, lead oxide, Titan Yellow, ultramarine, etc., can be used. In order to adjust the color tone of the agent in a subtle manner, a wide variety of pigments may be utilized with light-colored marking agents.

The term "heat-resistant" as used herein is intended to mean that the pigment can withstand heat upon application to hot steel to such an extent that the pigment does not produce noxious decomposition products nor gaseous decomposition products, e.g., is not decomposed or denatured at temperatures up to about 400° C. Otherwise, no problem exists even if the heat-resistant pigment is discolored within the temperature range applied. Although certain kinds of pigments which contain noxious heavy metals such as chromium, cadmium, etc., may be used only in small amount together with the above-described pigments, such pigments are usually undesirable in the sense that the pigment is employed in the form of fine powder. The volume content $v_i$ of a component can be calculated from the following relationship, by considering the weight ratio $\omega_i$ and the bulk density $\rho_i$.

$$v_i = \frac{(\omega_i/\rho_i)}{\Sigma(\omega_j/\rho_j)}$$

If the amount of the heat-resistant pigment in the marking agent is less than about 5% by volume, satisfactory coloration of the marking agent can not be attained. While if the amount of the heat-resistant pigment is greater than about 30% by volume a problem on adhesion to the steel member occurs since the marking agent flows with difficulty even if the thermoplastic linear polyester component is thermally melted. As a result, the marked image has an unsatisfactory mechanical strength. The amount of the heat-resistant pigment preferably is within a range of 6 to 20% by volume. Most preferably, the amount of the pigment is in the range of 15 to 20% by volume. In this most preferred pigment amount range, when the polyester component is decomposed on a hot member, the resulting gas can escape from the hot member in a satisfactory manner.

The thermoplastic linear polyester, which is an essential component of the binder, preferably has "a number average molecular weight of about 5,000 to about 60,000, (more preferably about 10,000 to 20,000) and a softening point of about 50° to about 170° C.", is soluble in certain kinds of organic solvents such as halogenated hydrocarbons, e.g., methylene chloride, ethylene chloride, trichloroethylene, etc., alkyl esters, e.g., butyl acetate, etc., ketones, e.g., acetone, methyl ethyl ketone, etc., aromatic hydrocarbons, e.g., toluene, xylene, etc., and has excellent heat resistance. Additionally, the thermoplastic linear polyester preferably is not cross-linked up to temperatures as high as possible. In this sense, the thermoplastic linear polyester preferably has -OH groups at the terminals of the respective molecules.

Typical examples of dicarboxylic acids suitable for producing the thermoplastic linear polyester include aromatic dicarboxylic acids such as terephthalic acid, isophthalic acid, etc. In order to render the final polyester soluble in a solvent, two or more dicarboxylic acids should preferably be used. Aliphatic dicarboxylic acids such as sebaacic acid have inferior heat resistance to aromatic dicarboxylic acids such as phthalic acid, 1,5-, 2,6- or 2,7-naphthalene-dicarboxylic acid, etc., with phthalic acid being preferred, and are usable only in a minor proportion (of less than about 10 mol % of the total acid component of the polyester).

Typical examples of diol components used in producing the thermoplastic linear polyester are 2,2-alkyl-substituted 1,3-propanediols and linear glycols such as ethylene glycol, 1,2-propanediol, 1,3-propanediol, 1,4-butanediol, 1,5-pentanediol, diethylene glycol, triethylene glycol, etc. It is desirable from the standpoint of heat resistance for 2,2-alkyl-substituted 1,3-propanediols to be present in an amount of about 60 mol % or more of the total of diol component of the polyester. 2,2-Alkyl-substituted 1,3-propanediols are those expressed by the following general formula

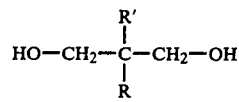

in which R and R' which may be the same or different, each represent an alkyl group having 1 to 5 carbon atoms. Representative examples of such include neopentyl glycol (e.g., wherein R and R' in the above formula are each a methyl group) 2,2-diethyl-1,3-propanediol, 2-ethyl-2-propyl-1,3-propanediol, 2-ethyl-1-butyl-1,3-propanediol, 2-ethyl-2-pentyl-1,3-propanediol, 2,2-dipropyl-1,3-propanediol, 2-propyl-2-butyl-1,3-propanediol, 2,2-dibutyl-1,3-propanediol, 2-butyl-2-pentyl-1,3-propanediol, 2,2-dipentyl-1,3-propanediol, etc.

The thermoplastic linear polyester should preferably have a degree of polymerization corresponding to an intrinsic viscosity of about 0.6 to about 0.9 which is measured as described in British Patent No. 1,118,538. A preferred composition for the thermoplastic linear polyester comprises about 40 to about 70 mol % terephthalic acid, about 30 to about 60 mol % isophthalic acid, about 60 to 95 mol % neopentyl glycol and about 5 to about 40 mol % ethylene glycol.

In order to improve the wetting of the heat resistant pigment by the binder or the powdering efficiency, highly polar or fragile resins may be added in the preparation of the marking agent. In the practice of the invention, addition of a lower molecular weight thermoplastic linear polyester having an average molecular weight of about 1,000 to about 4,000 (preferably about 1,500 to about 2,000) and a softening point of about 60° to about 100° C. in an amount of about 2 to about 30% by weight of the thermoplastic linear polyester is effective in obtaining powder particles with a uniform shape and improving the flow characteristics of the powder. Addition of the saturated polyester in an amount greater than about 30% by weight is undesirable since blocking tends to take place during storage because of the low molecular weight and low softening point of the saturated polyester.

When the amount of the thermoplastic linear polyester in the marking agent is less than about 48% by volume, adhesion to the steel member by heat is insufficient. On the other hand, greater than about 92% by volume of the thermoplastic polyester in the marking agent results in unsatisfactory heat resistance.

The fluorine-containing polymer serves somewhat as a pigment at low or middle temperature ranges as will be described hereinafter, and acts as a binder in high temperature ranges to show an adhesion effect.

A number of fluorine-containing polymers are commercially available, of which the following have been found experimentally to be suitable for the practice of the invention, i.e., polytetrafluoroethylene (PTFE), poly(monochlorotrifluoroethylene) (PCTFE), tetrafluoroethylene-perfluoroalkylvinyl ether copolymer (PFA), tetrafluoroethylene-ethylene copolymer (ETFE), and tetrafluoroethylene-hexafluoropropylene copolymer (FEP). Of these commercially available resins, PTFE, PCTFE and FEP are preferred and PFA and ETFE are most preferred. A suitable degree of polymerization of these fluorine containing polymers is about 10,000 to about 100,000. FEP has a melting point of 285° to 295° C., a specific gravity of 2.12 to 21.7 and a melt viscosity of $10^4$ to $10^5$ poise (380° C.). ETFE has a melting point of 270° C., a specific gravity of 1.70 and a melt viscosity of $10^4$ to $10^5$ poise (300° to 330° C.). PFA has a melting point of 302° to 310° C., a specific gravity of 2.12 to 2.17 and a melt viscosity of $2.6 \times 10^4$ poise (372° C.). The reason why the PFA and ETFE are most preferred is due to the fact that these resins begin to melt in a temperature range where considerable decomposition of the thermoplastic linear polyester takes place and these resins have good adhesiveness to metal. In addition, these resins impart a suitable degree of flexibility to the image pattern obtained after cooling.

PTFE has such a high melting point that it does not melt under relatively mild heating conditions (for example, at about 375° C. and 2 to 4 minutes) where the thermoplastic linear polyester begins to decompose, and thus it is difficult to obtain a marking effect. PCTFE has a melting point of about 200° C. and thus limits the conditions which can be used in the preparation of the marking agent powder. FEP has a slightly higher melt viscosity than that of PFA and ETFE and had inferior adhesiveness to metals as well. PTFE, PCTFE and FEP are preferably used together with at least one of PFA and ETFE and are not employed individually. The amount of PFA and/or ETFE when used in combination is at least about 40%, preferably at least 50%, by volume based on the total volume of the fluorine-containing polymers.

If the amount of the fluorine-containing polymer is less than about 2% by volume of the total volume of the marking powder the effect thereof is greatly reduced while an amount beyond about 40% by volume tends to lower the physical strength of the image in low or middle temperature ranges and disadvantageously increases the lower limit temperature of the thermal adhesion of the powder. From the above, the amount of the fluorine-containing polymer is generally in the range of about 2 to about 40% by volume.

Apart from the foregoing essential components, the marking agent may contain, in minor proportions, plasticizers such as p-toluenesulfonamide, coumarone-indene resins, petroleum resins, rosin esters, etc., flow-adjusting agents, surface active agents, and other resins for improving adhesion. The amount of these minor components should be less than about 7% by volume of the marking agent powder composition. The flow-adjusting agent plays the practically important roll of causing the fine powder to flow satisfactorily in the middle temperature range. For this purpose, oligomers of acrylic acid esters and methacrylic acid esters, and copolymers of these esters, etc., are used as flow-adjusting agents. Further, a variety of resins can be used to improve the production efficiency and adhesiveness as mentioned above. The resin selected should preferably not cross-link with the essential thermoplastic linear polyester even in the high temperature range. The term high temperature range as used herein means a rather unusually high temperature range of above about 300° C. Since the marking agent is baked under conditions considerably different from those conditions employed for ordinary paint baking, great care must be taken to choose resins which do not impede the fluidity of the marking agent under the marking conditions employed.

The functional effects of the respective components of the marking agent according to the invention are described below.

Where members having widely different temperatures are randomly fed to a marking station (or where already marked members are heated to different temperatures), a most serious problem on the design of marking agent compositions arises. Use of the marking agent in the form of a fine powder results in an additional limitation.

The marking agent must have a satisfactory durability or heat resistance over those temperature ranges which are practically expected and must provide an image with an optically excellent contrast. The most widely accepted fixation of the marking agent is one which is well known in the art of electrophotography, i.e., solvent fixation and heat fixation can be appropriately used in a low temperature range and in a middle or a high temperature range, respectively.

In general, organic compounds and organic resins can not withstand use at extremely high temperatures. As a result, marking agents using inorganic compounds such as low melting point glasses are known. The marking operation in the temperature range of from about 350° C. to about 400° C. is most troublesome, at which temperature range almost all organic compounds are thermally decomposed but not completely decomposed readily.

The idea of addition of a certain glass component to an organic resin system, the latter being allowed to be completely decomposed in high temperature ranges and the former serving as a fixing agent in place of the resin has long been known. In this connection, however, insufficient decomposition of the organic materials takes place in the vicinity of about 400° C. and the pigment employed generally absorbs a large amount of the incompletely decomposed organic material. Accordingly, even if the glass per se is molten, the glass does not wet the pigment. The image obtained after cooling is not durable. Addition of oxidizing agents for accelerating the decomposition is not practical from the standpoint of environmental pollution or from the standpoint of hazardous working operations.

When a powder pattern is formed using electrostatic recording techniques, the powder mixture is difficult to use. Especially when an inorganic material is used, a clear powder pattern may not be obtained mainly due to a lack of electrical insulation property.

The marking agent of the present invention solves all of the problems just described. That is, the marking agent can be simply fixed in a low temperature range [of normal temperature to a temperature at which thermal flow of the powder is initiated (about 120°-150° C.)] by spraying solvents such as chlorinated hydrocarbons, e.g., trichloroethylene, methylene chloride, etc., ketones, e.g., acetone, methyl ethyl ketone, etc., alkyl esters, e.g., ethyl acetate, butyl acetate, etc., aromatic hydrocarbons, e.g., toluene, xylene, etc., over the powder pattern since the thermoplastic linear polyester is soluble in these ordinary solvents. Upon fixation, the fluorine-containing resin behaves as a binder.

When a member to be treated has a temperature close to the upper limit of this low temprature range, a fixing solution containing a small amount of a high melting point solvent or plasticizer such as tricresyl phosphate, cresyldiphenyl phosphate, ethylphthalyl ethylglycolate, butylphthalyl butylglycolate, liquid chlorinated paraffin, partially hydrogenated terphenyl, etc. dissolved therein is used.

In the middle temperature range (of a temperature of powder thermal flow-initiation to a temperature at which considerable decomposition takes, i.e., from about 120° to 150° C. to about 360° C.), the thermoplastic linear polyester is allowed to melt and flow, thereby providing a physically strong image when the member is cooled. The member is usually sent to a marking station while continuously emitting heat to the surroundings. The temperature of the member is consequently decreasing. In this sense, the marking conditions for marking steel members are very different from ordinary powder coating conditions. More particularly, when a thermosetting resin (such as a thermosetting polyester, an epoxy resin, a thermosetting acrylic resin or the like) is used, a curing reaction is often induced simultaneously with the application of the marking agent to such an extent that thermal flow of the marking agent is impeded. In addition, if the member temperature exceeds that level at which the curing reaction proceeds to a suitable degree, decomposition proceeds smoothly, resulting in the formation of a porous image which is mechanically very fragile. As emphasized hereinbefore, it is accordingly very important that the resin components are of the nature which ensures a fluid state even at high temperatures over a time period as long as possible.

In the temperature range above about 360° C., the thermoplastic linear polyester rapidly decomposes with the lapse of time, resulting in a very fragile image after cooling. In the practice of the invention, however, most of the fluorine-containing polymers begin to melt slowly in this high temperature range and may sometimes serve to accelerate the coloration of a pattern due to decomposition of the thermoplastic linear polyester. It has been unexpectedly found that the fluorine-containing polymer markedly improves the mechanical strength of a pattern in which parallel decomposition has occurred. Surprisingly, the mechanical strength of the image has been found to be remarkably improved only by addition of several percent of a fluorine-containing polymer. Based on experience in this art, this is completely unexpected.

While not desiring to be bound, the reason why the mechanical strength is improved is considered to be as follows. With a thermoplastic linear polyester alone, the melt viscosity of the resin which has underone a thermal decomposition is increased and flow is difficult. The gas generated simultaneously with the decomposition leaves bubbles in the film. In addition, the thermoplastic linear polyester which remains undecomposed is not free to flow, so that the film is porous and in a skeleton-like state and thus becomes very brittle with poor mechanical strength. In contrast thereto, it has been found that when a resin component containing a fluorine-containing polymer is used, the resulting film has almost the same appearance as films where no fluorine-containing polymer is used but the degree of porosity or voids are reduced during cooling and the film strongly adheres to the substrate surface with high mechanical strength. Presumably this is because the fluorine-containing polymer acts to maintain the resin component of the image in a low viscosity condition even at high temperature, ensuring the flowability of the resin component. In this sense, the amount of the heat-resistant pigment present greatly influences the image pattern. Although a low amount of the heat-resistant pigment renders the low temperature flowability ideal, a large amount of bubbles are inevitably produced in the high temperature range due to the decomposition of the thermoplastic linear polyester such that the bubbles burst through the film and a mechanically strong continuous film is not obtaining. As a result, the melt viscosity tends to increase. In the case, the relative amount of the fluorine-containing polymer must be increased.

On the other hand, when a large amount of the heat-resistant pigment is used, the gases produced by the decomposition tend to escape through the voids between the heat-resistant pigment particles. Accordingly, a relatively small amount of the fluorine-containing polymer is sufficient to yield an image of high mechanical strength.

In the low or middle temperature range, most of the fluorine-containing polymers behave as a pigment, so that the total amount by volume of the heat-resistant pigment and the fluorine-containing polymer preferably does not exceed a certain value. In the practice of the invention, the total amount of the heat-resistant pigment and the fluorine-containing polymer should preferably be below about 45% by volume. This value is much higher than in the case of known powder coatings. Even so, a marking agent with such a large amount of the heat-resistant pigment and resin components will produce a good result since the smoothness of the marking film is not of importance for the purpose of the invention and marking in the low temperature range is feasible with the aid of a solvent for fixation.

As can be seen from the above description, the powder marking agent suitable for carrying out the method of the invention comprises about 55 to about 80% by volume of a thermoplastic linear polyester, about 10 to about 22% by volume of a heat-resistant pigment, and about 4 to about 15% by volume of a fluorine-containing polymer, the fluorine-containing polymer preferably containing PFA and/or ETFE in an amount of about 2% or more, preferably, 3% or more by volume of the marking agent.

The marking agent according to the invention has a high thermal insulation property and very excellent latent image-developing characteristics and is stable over wide ranges of temperature and humidity.

Broadly, the powdering of the marking agent, e.g., to a particle size of about 10 to about 200$\mu$, preferably 20 to 150$\mu$, most preferably 25 to 80$\mu$, can be produced using three methods. First, all the components are mixed together and then the mixture is finely powdered. Second, all of the components except the fluorine-containing polymer are comminuted to a desired particle size within the range described above, to which the fluorine-containing polymer powder is added. In this case, the fluorine-containing polymer particles preferably are smaller in size, by which the two kinds of the powders are electrostatically combined and behave in a stable manner in most cases. Third, a fluorine-containing polymer and all of or a part of a heat-resistant pigment, which have been previously mixed, are finely freeze powdered. Then, the resulting powder is mixed with a fine powder of a thermoplastic linear polyester alone or a mixture of a thermoplastic linear polyester and the remainder of the heat-resistant pigment. The last method is inferior to the former two methods in terms of the variation in physical characteristics on long use and also in production cost.

The marking agent can be prepared by introduction of (i) the resin binders, (ii) optionally, the flow-adjusting agent and (iii) heat-resistant pigment in this order into a pre-mixing mixer (such as a Nauter mixer produced by Hosokawa Tekkosho K.K., or a ball mill) for rough mixing and then kneading the mixture in an extruder at about 189° C. to about 200° C. After cooling, the kneaded material is coarsely ground and then finely freeze powdered by use of a fine powdering machine. The resulting powder may contain particles of a relatively large sizes and it is necessary screen such through a 120 to 150 mesh screen to obtain a powder product of a uniform particle size.

Known marking techniques using powder marking agents can be employed for the marking method of the invention. The marking agent described hereinbefore is the most suitable for the above purpose. Suitable marking techniques are described in Hisao Suzuki, "Automatization of Marking in the Iron-making Industry" *Instrumentation Techniques, (August,* 1974).

The marking powder according to the invention can be effectively applied using electrostatic methods and is most suitable for carrying out the method described in our Japanese Patent Application No. 149244/1975, with fixation using heat or a solvent, In addition, the marking agent is very suitable for use in methods wherein the marking powder is applied to a member through a stencil screen or a stencil.

As can be seen from the foregoing, the method of the present invention is useful in marking a member which is at normal temperature or a relatively low temperature during the marking and which then is heated to a high temperature of about 400° C.

The present invention is illustrated in greater detail by way of the following examples, in which the preparations of marking agents are first described and then marking methods using the marking agents are described subsequently.

Unless otherwise indicated herein, all parts, percents, ratios and the like are by weight.

Preparatory Examples I–V

Five kinds of compositions as indicated in Table 1 were each powdered to a particle size of 15–50 μ using a known method. All of the fluorine-containing polymers, which had been previously finely freeze powdered, were used for the subsequent powdering. Moreover, the kneading of the composition was conducted at temperatures below the melting point of the fluorine-containing polymers employed.

Table 1

| | | | Marking Powder Agent Compositions | | | | | | | | | |
|---|---|---|---|---|---|---|---|---|---|---|---|---|
| | | | Preparatory Example No. | | | | | | | | | |
| | | | I | | II | | III | | IV | | V | |
| Component | Compound | Specific Gravity | Weight % | Volume % | Weight % | Volume % | Weight % | Volume % | Weight % | Volume % | Weight % | Volume % |
| Pigment | | | | | | | | | | | | |
| | TiO$_2$ | 4.26 | 45 | 20.3 | 40 | 17.3 | 28 | 11.6 | — | — | 28 | 11.6 |
| | Carbon Black | 1.95 | — | — | — | — | — | — | 10 | 7.6 | — | — |
| Polyester | | | | | | | | | | | | |
| | Saturated Linear Polyester*(1) | 1.26 | 45 | 68.7 | 50 | 73.1 | 50 | 70.5 | 70 | 77.2 | 35 | 49.2 |
| | Low Molecular Weight Saturated Polyester *(2) | 1.25 | — | — | — | — | — | — | — | — | 15 | 21.1 |
| Fluorine-Containing Polymer | | | | | | | | | | | | |
| | ETFE | 1.72 | 10 | 11.8 | 5 | 5.4 | — | — | 20 | 16.0 | — | — |
| | PFA | 2.15 | — | — | — | — | 14 | 11.4 | — | — | 14 | 11.4 |
| | PTFE | 2.17 | — | — | 5 | 4.3 | 8 | 6.6 | — | — | 8 | 6.6 |

*(1)Copolyester of 50 mol % of terephthalic acid and 50 mol % of isophthalic acid and of 25 mol % of ethylene glycol and 75 mol % of neopentyl glycol, having a molecular weight of about 17,000 and a softening point of 163° C. determined by the ring and ball method.
*(2)Copolyester having the same composition as copolyester (1) above and a molecular weight of about 1,500 and a softening point of 68° C.

EXAMPLES I–V

The heat resistance of each of the marking agents produced in Preparatory Examples I to V and of each of marking agents similar to but slightly different in composition from those of the Preparatory Examples as shown in Table 2 was determined for comparison by the following method using marking conditions somewhat different from those of practical marking operations. That is, a marking agent powder to be tested was uniformly distributed in an image-wise pattern over a 1 mm thick black steel plate in a coating thickness of about 20μ. The steel plate having the marking agent image-wise distributed thereon was placed in air on the upper surface of an iron disc (having a diameter of 100 mm and a thickness of 80 mm) of a sufficiently large heat capacity. The iron disc was heated from the bottom thereof using an electric heater to maintain the temperature constant. At different periods of time after the heating, the plate was removed each time from the iron disc to evaluate the condition of the image obtained after cooling.

When the powder layers were each subjected for charging to a corona discharge to determine the time period required for discharge, it was found that all of the powder layers had very long discharging time periods and were thus suitable as an electrophotographic toner. The test results obtained are shown in Table 2 below.

Table 2

| Ex. No. | Marking Agent | Heating Temperature | |
|---|---|---|---|
| | | 350° C. | 375° C. |
| I | Composition of Preparatory Example I | Maintained very mechanically strong when heated over 15 minutes. | Turned fragile when heated for more than 7 minutes but maintained very strong up to that time. |
| I' | Composition of Preparatory | Turned very fragile when | Blistered vigorously when heated |

Table 2-continued

| Ex. No. | Marking Agent | Heating Temperature 350° C. | 375° C. |
|---|---|---|---|
| | Example I without ETFE | heated more than 5 minutes. | more than 2 minutes to result in a very mechanically fragile film. |
| II | Composition of Preparatory Example II | Same as Example I. | Turned very fragile when heated more than 10 minutes. |
| II' | Composition of Preparatory Example II without ETFE and PTFE | Turned very fragile when heated more than 4 minutes. | Turned fragile when heated more than 1.5 minutes. |
| III | Composition of Preparatory Example III | Did not turn fragile when heated for 20 minutes. | Turned fragile when heated more than 12 minutes. |
| III' | Composition of Preparatory Example III without PFA and PTFE | Turned fragile when heated more than 3 minutes. | Same as in Example II'. |
| IV | Composition of Preparatory Example IV | Did not turn fragile when heated up to 10 minutes. | Turned slightly fragile when heated more than 6 minutes. |
| IV' | Composition of Preparatory Example IV without ETFE | Turned fragile when heated more than 3 minutes. | Turned fragile when heated more than 2 minutes. |
| V | Composition of Preparatory Example V | Same as Example III. | Same as Example III. |
| V' | Composition of Preparatory Example V without PEA and PTFE | Same as Example III'. | Same as Example III'. |

It should be noted that the compositions of Examples III and III' were each applied onto the plate to which a silver white heat-resistant film had been previously applied. The film was obtained by spray-coating "SUNTOMO TD-150" produced by Tokushu Shikiryo Kogyo K.sK. and available from Mitsui Bussan K.K., and drying.

As can be seen from the results in Table 2, the fluorine-containing polymers serve to improve the heat resistance of the marking compositions. The decrease in adhesiveness which would otherwise occur was not observed at all even with composition samples exposed to heating conditions where the fluorine-containing polymers melted. Presumably, this is because the thermoplastic linear polyester takes part in the adhesiveness. The fluorine-containing polymers tend to reduce the optical contrast and have a tendency toward coloring entirely the composition deeply especially under severe heating conditions although they serve to maintain high mechanical strength. This tendency becomes more marked at a higher amount of the fluorine-containing polymer or at a lower amount of the heat-resistant pigment.

In general, the optical reflection density of a black skin steel plate is in the range of 1.5–1.8. The reflection density of the image of Example I formed after heating at 375° C. for 5 minutes was found to be about 0.9 and the image was tinged with a brown color. Thus, it is easy to visibly distinguish the marked image.

Upon comparing the fluidity of the compositions at lower temperatures, there was no problem since the addition of the fluorine-containing polymer in any of the compositions increased the heat-fixable lower limit temperature only by 15°–25° C.

EXAMPLE VI

A powder of 35 parts by weight of titanium oxide and 65 parts by weight of a saturated linear polyester (the same kind as described in the foregoing Examples) was prepared and passed through a 100 mesh sieve. The resulting powder was added to and mixed satisfactorily with a powder of 5 parts by weight of ETFE and 10 parts by weight of PTFE. The fluorine-containing polymer powder employed was a powder of particles passing through a 200 mesh sieve.

The powder mixture was subjected to heat-resistance testing in a similar manner to the foregoing Examples. As a result, it was found that the mixture was resistant to heating at 375° C. over more than 5 minutes.

EXAMPLE VII

A marking test was conducted using the marking powder obtained in Preparatory Example II.

That is, an aluminum-evaporated polyethyleneterephthalate (PET) film (having a thickness of 100 μ), was first provided and an electrostatic latent image of a number of 1 mm×1 mm dots was formed thereon using a needle electrode applied with a high voltage of a positive polarity. On the other hand, a metal plate to which the marking powder of Preparatory Example I had been applied in a thickness of about 50μ was provided. In this case, the polarity upon the application was negative and hence the marking powder layer was negatively charged. When the PET film and the powder layer were placed sufficiently close to each other, the dot pattern was clearly developed. Then, the pattern on the PET film was electrostatically transferred to a belt treated with heat-resistant Teflon (a trade name produced by E.I. Du Pont de Nemours) on the surface thereof.

The belt was placed close to steel plates at different temperatures at a distance of 7 mm. Then, the belt was subjected to supersonic vibrations while applying a potential of 5 KV between the back surface of the belt and the steel plate. As a consequence, the pattern was faithfully transferred to the steel plates. Each of the steel plates had a maximum temperature upon transfer and was subsequently allowed to cool at normal temperature conditions. The test results obtained using a steel plate thickness of 50 mm are shown below.

Table 3

| Steel Plate Temperature upon Marking | Marking Powder Behavior |
|---|---|
| Below 140° C. | Powder pattern was difficult to melt and was fixed by spraying a 5% tetrachloroethane or ethylphthalyl ethylglycolate solution in xylene. |
| 150° C.–360° C. | Melted satisfactorily by the heat of the steel plate. |
| Above 360° C. | Marking powder was considerably colored and decomposed while giving off smoke but the image which had been once heated to 390° C. and cooled was distinguishable by the naked eye and mechanically strong. |

EXAMPLE VIII

Marking was conducted using the powder of Preparatory Example IV as follows.

A 50 mm thick steel plate having a continuous temperature gradiation up to 500° C. therein was uniformly coated with a marking paint "SUN EKON" produced by Taiyo Kako K.K., in areas to be marked, thereby forming a white film. The composition of the marking paint is not known but provided a film of inorganic material on the hot steel plate.

Then, the powder of Preparatory Example IV was applied onto the film in a desired pattern using a method similar to that of Example VII. Up to the marking temperature of 400° C., an image without any mechanical problems was obtained. The image contrast was extremely excellent.

EXAMPLE IX

Example IV was repeated using the marking powder of Preparatory Example IV which employed, instead of 70 parts by weight of the thermoplastic linear polyester, a mixture of 65 parts by weight of the polyester just described and 5 parts by weight of PHENOXY resin (produced by Union Carbide Co.), giving almost the same results as in Example IV.

EXAMPLE X

The procedures in Preparatory Example III were repeating using 18% by weight of ETFE and 4% by weight of PFA. The resulting powder was used for marking, giving good results similar to those of the foregoing Examples.

EXAMPLE XI

The procedures of Preparatory Example IV were repeated using 10% by weight of ETFE and 10% by weight of PCTFE. The resulting powder was used for marking, giving good results similar to those of the foregoing Examples.

While the invention has been described in detail and with reference to specific embodiments thereof, it will be apparent to one skilled in the art that various changes and modifications can be made therein without departing from the spirit and scope thereof.

What is claimed is:

1. A marking agent powder comprising
   (a) about 48% to about 92% by volume of a thermoplastic linear polyester of at least one aromatic dicarboxylic acid, as an acid component, and at least one of a 2,2-alkyl-substituted 1,3-propanediol and a linear alkylene or polyalkylene glycol, as a diol component,
   (b) about 5 to about 30% by volume of a heat-resistant pigment, and
   (c) about 2 to about 40% by volume of a fluorine containing polymer,
   the total percent by volume of the heat-resistant pigment (b) and the fluorine-containing polymer (c) being about 45% by volume or less.

2. The powder of claim 1, wherein said heat-resistant pigment is titanium dioxide, zinc oxide, zinc sulfide, antimony oxide or zirconium oxide.

3. The powder of claim 2, wherein said heat-resistant pigment additionally contains, as an extender pigment, at least one of barium sulfate, aluminum oxide, silicon oxide or calcium silicate.

4. The powder of claim 1, wherein said thermoplastic linear polyester has a number average molecular weight ranging from about 5,000 to about 60,000 and a softening point of about 50° to about 170° C.

5. The powder of claim 4, wherein said acid component contains no more than about 10 mol % of an aliphatic dicarboxylic acid and wherein the diol component comprises about 60 mol % or more of a 2,2-alkyl-substituted 1,3-propanediol.

6. The powder of claim 4, wherein said thermoplastic linear polyester has a degree of polymerization corresponding to an intrinsic viscosity of about 0.6 to about 0.9.

7. The powder of claim 5, wherein said thermoplastic linear polyester comprises about 40 to about 70 mol % terephthalic acid and about 30 to about 60 mol % isophthalic acid with about 60 to about 95 mol % neopentyl glycol and about 5 to about 40 mol % ethylene glycol.

8. The powder of claim 1, wherein said marking agent powder additionally contains a saturated polyester having an average molecular weight of about 1,000 to about 4,000 and a softening point of about 60° to about 100° C. in an amount of 2 to about 30% by weight based on the weight of the thermoplastic linear polyester.

9. The powder of claim 1, wherein said fluorine-containing polymer is at least one of a tetrafluoroethyleneperfluoroalkylvinyl ether copolymer, a tetrafluoroethylene-ethylene copolymer, or a tetrafluoroethylene-hexafluoropropylene copolymer.

10. The powder of claim 1, wherein said marking agent powder contains less than about 7% by volume of at least one of a plasticizer, a flow-adjusting agent, a surface active agent or an adhesion improving resin.

11. The powder of claim 1, wherein said marking agent powder has a particle size ranging from about 10μ to about 200μ.

12. The powder of claim 1, wherein the degree of polymerization of said fluorine-containing polymer ranges from about 10,000 to about 100.000.

13. The powder of claim 1, wherein said marking agent powder contains at least about 2% by volume of a tetrafluoroethylene-perfluoroalkylvinyl ether copolymer and/or a tetrafluoroethylene-ethylene copolymer.

14. The powder of claim 1, wherein said marking agent powder contains at least about 3% by volume of a tetrafluoroethylene-perfluoroalkylvinyl ether copolymer and/or a tetrafluoroethylene-ethylene copolymer.

15. The powder of claim 11, wheerein said marking agent powder has a particle size ranging from 20μ to 150μ.

16. In a marking method which comprises applying a powder of a marking agent onto a metal member in a marking pattern, the improvement wherein the marking agent powder comprises
   (a) about 48% to about 92% by volume of a thermoplastic linear polyester of at least one aromatic dicarboxylic acid, as an acid component, and at least one of a 2,2-alkyl-substituted 1,3-propanediol and a linear alkylene or polyalkylene glycol, as a diol component,
   (b) about 5 to about 30% by volume of a heat-resistant pigment, and
   (c) about 2 to about 40% by volume of a fluorine-containing polymer,
   the total percent by volume of the heat-resistant pigment (b) and the fluorine-containing polymer (c) being about 45% by volume or less.

17. The method of claim 16, wherein said heat-resistant pigment is titanium dioxide, zinc oxide, zinc sulfide, antimony oxide or zirconium oxide.

18. The method of claim 17, wherein said heat-resistant pigment additionally contains, as an extender pigment, at least one of barium sulfate, aluminum oxide, silicon oxide or calcium silicate.

19. The method of claim 16, wherein said thermoplastic linear polyester has a number average molecular weight ranging from about 5,000 to about 60,000 and a softening point of about 50° to about 170° C.

20. The method of claim 19, wherein said acid component contains no more than about 10 mol % of an aliphatic dicarboxylic acid and wherein the diol component comprises about 60 mol % or more of a 2,2-alkyl-substituted 1,3-propanediol.

21. The method of claim 19, wherein said thermoplastic linear polyester has a degree of polymerization corresponding to an intrinsic viscosity of about 0.6 to about 0.9.

22. The method of claim 20, wherein said thermoplastic linear polyester comprises about 40 to about 70 mol % terephthalic acid and about 30 to about 60 mol % isophthalic acid with about 60 to about 95 mol % neopentyl glycol and about 5 to about 40 mol % ethylene glycol.

23. The method of claim 16, wherein said marking agent powder additionally contains a saturated polyester having an average molecular weight of about 1,000 to about 4,000 and a softening point of about 60° to about 100° C. in an amount of 2 to about 30% by weight based on the weight of the thermoplastic linear polyester.

24. The method of claim 16, wherein said fluorine-containing polymer is at least one of a tetrafluoro-ethylene-perfluoroalkylvinyl ether copolymer, tetrafluoroethylene-ethylene copolymer or tetrafluoroethylene-hexafluoropropylene copolymer.

25. The method of claim 16, wherein said marking agent contains less than about 7% by volume of at least one of a plasticizer, a flow-adjusting agent, a surface active agent or an adhesion improving resin.

26. The method of claim 16, wherein said marking agent powder has a particle size ranging from about 10μ to about 200μ.

27. The method of claim 16, wherein the applying of the marking agent powder is electrostatically applying the marking agent powder.

28. The method of claim 16, wherein the degree of polymerization of said fluorine-containing polymer ranges from about 10,000 to about 100,000.

29. The method of claim 16, wherein said marking agent powder contains at least about 2% by volume of a tetrafluoroethylene-perfluoroalkylvinyl ether copolymer and/or a tetrafluoroethylene-ethylene copolymer.

30. The method of claim 16, wherein said marking agent powder contains at least about 3% by volume of a tetrafluoroethylene-perfluoroalkylvinyl ether copolymer and/or a tetrafluoroethylene-ethylene copolymer.

31. The method of claim 26, wherein said marking agent powder has a particle size ranging from 20μ to 150μ.

32. The powder of claim 1, wherein said fluorine-containing polymer is at least one of polytetrafluoroethylene and poly(monochlorotrifluoroethylene).

33. The method of claim 16, wherein said fluorine-containing polymer is at least one of polytetrafluoroethylene and poly(monochlorotrifluoroethylene).

* * * * *